United States Patent [19]

Crump

[11] E Re. 29,493

[45] Reissued Dec. 13, 1977

[54] CABLE CLEANING UNITS

[75] Inventor: Desmond George Crump, Wembley Downs, Australia

[73] Assignee: Phido (Wire Services) Co., Ltd.

[21] Appl. No.: 712,723

[22] Filed: Aug. 9, 1976

Related U.S. Patent Documents

Reissue of:

[64] Patent No.: 3,916,925
Issued: Nov. 4, 1975
Appl. No.: 443,325
Filed: Feb. 19, 1974

[30] Foreign Application Priority Data

Feb. 19, 1973 Australia ..... 2314/73

[51] Int. Cl.[2] ..... B08B 3/02

[52] U.S. Cl. ..... 134/172; 134/183; 134/199; 118/DIG. 11; 118/307; 184/15 R

[58] Field of Search ..... 134/64, 122, 172–173, 134/182–183, 199; 118/DIG. 11, DIG. 22, 307, 325; 184/15 R, 15 A, 15 B

[56] References Cited

U.S. PATENT DOCUMENTS

| | | | |
|---|---|---|---|
| 2,429,915 | 10/1947 | Bell | 118/DIG. 11 |
| 2,858,555 | 11/1958 | Medovick | 134/172 X |
| 2,967,119 | 1/1961 | Gutterman | 134/64 X |
| 3,662,707 | 5/1972 | Dreve, Jr. | 118/307 X |
| 3,800,435 | 4/1974 | Woellner | 134/122 X |

*Primary Examiner*—Robert L. Bleutge
*Attorney, Agent, or Firm*—Ulle C. Linton

[57] ABSTRACT

A cable cleaning unit comprising a chamber adapted to surround a section of the cable to be cleaned, a plurality of outlets located within the chamber through which jets of high pressure fluid are directed onto the surface of the cable and mechanism for withdrawing fluid from the chamber.

5 Claims, 4 Drawing Figures

CABLE CLEANING UNITS

Matter enclosed in heavy brackets [ ] appears in the original patent but forms no part of this reissue specification; matter printed in italics indicates the additions made by reissue.

This invention relates to cable cleaning units.

All cable cleaning units at present in use utilise brushes which brush the external rust and scale and caked external lubricant from the cable. Because such units are bulky it is necessary that the cleaning operation be carried out at ground level which means that the cable must be first removed from the equipment and then replaced.

The object of the present invention is to provide a cable cleaning unit which does not require the use of brushes and which can be used for cleaning the cable in situ.

In one form the invention resides in a cable cleaning unit comprising a chamber adapted to surround a section of the cable to be cleaned, a pluraity of outlets located within the chamber through which jets of high pressure fluid are directed onto the surface of the cable said jets being arranged so that they strike the surface of the cable at an angle inclined to the longitudinal axis of the cable being cleaned and are deflected from the surface of the cable in the direction of travel of the cable cleaning unit, the portion of the chamber receiving the deflected jets being arcuate so as to direct the fluid with dirt and other matter entrained therein away from the surface of the cable and means for withdrawing fluid from the chamber.

The invention will be better understood by reference to the following description of one specific embodiment shown in the accompanying drawings wherein.

Figure 1:
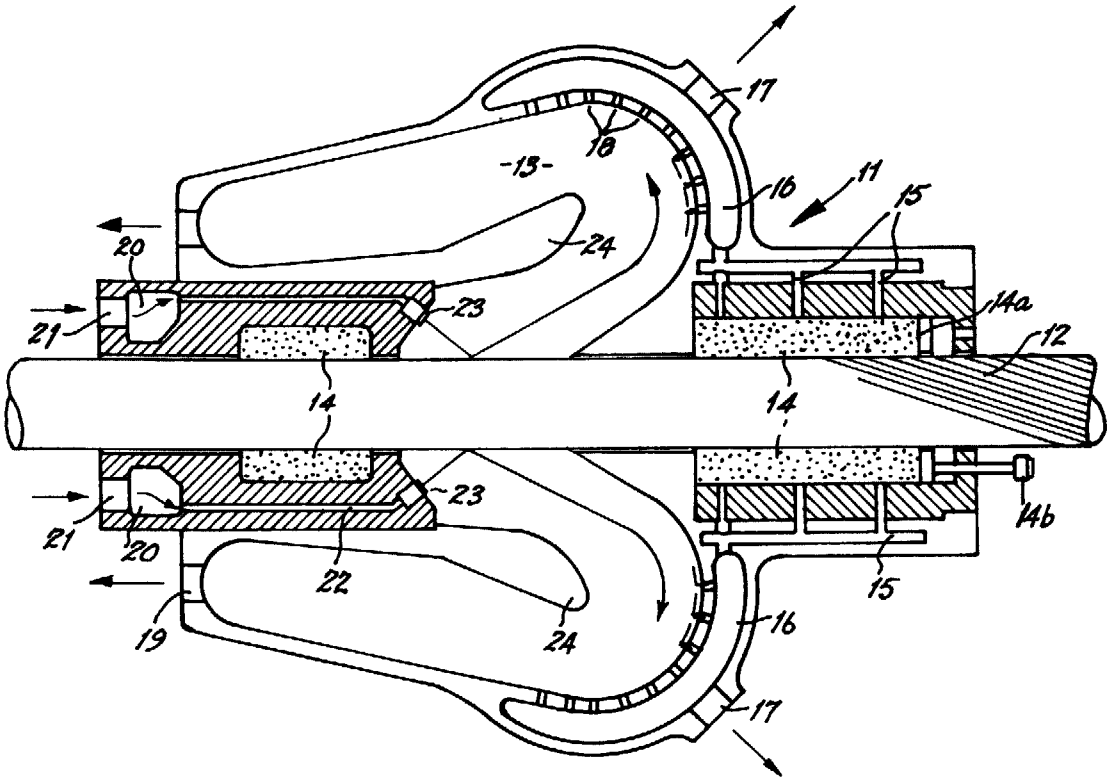
FIG. 1 is a sectional view of the cleaning unit.

As shown in FIG. 1 of the drawings a more or less cylindrical body 11 is divided into two halves so that it can be fitted around a cable 12. In the assembled position the body is provided with an annular chamber 13. Each end of the body is provided with resilient seals 14. The seals at the forward end of the body are compressed by means of a plate 14a mounted on the end of a threaded member 14b projecting through the body and the rear faces of said seals are connected to passages 15 which connect to a manifold 16 which is provided with outlets 17 adapted to be connected to a suction line. The forward end of the chamber 13 which receives the jets of fluid deflected from the surface of the cable is arcuate so that the fluid with dirt entrained therein is directed away from the cable. The arcuate portion of the chamber is connected to the manifold 16 through holes or openings 18 whilst the other end of the chamber is provided with outlets 19 which are also connected to the suction line. The centrifugal force acting on the fluid as it moves around the arcuate portion of the chamber ensures that a large proportion thereof passes through the openings 18 to ensure that it cannot return to the vicinity of the cable to interfere with the cleaning action of the jets.

A manifold 20 is provided with inlets 21 and is connected through passages 22 to a series of nozzles 23 arranged around the cable within the chamber and adapted to direct jets of fluid onto the surface of the portion of the cable within the chamber. Any suitable fluid may be used but it is preferable to use the lubricant preparation normally used for lubricating cables. The fluid is at a pressure of the order of 4000–5000 p.s.i. The jets impinging on the cable remove all extraneous matter from the surface of the cable. The lubricant also penetrates the cable to the core. The tongue or lip 24 projecting into the chamber prevents the used fluid with entrained solid matter from falling back onto and interfering with the action of the jets issuing from nozzles 23.

Figure 2:
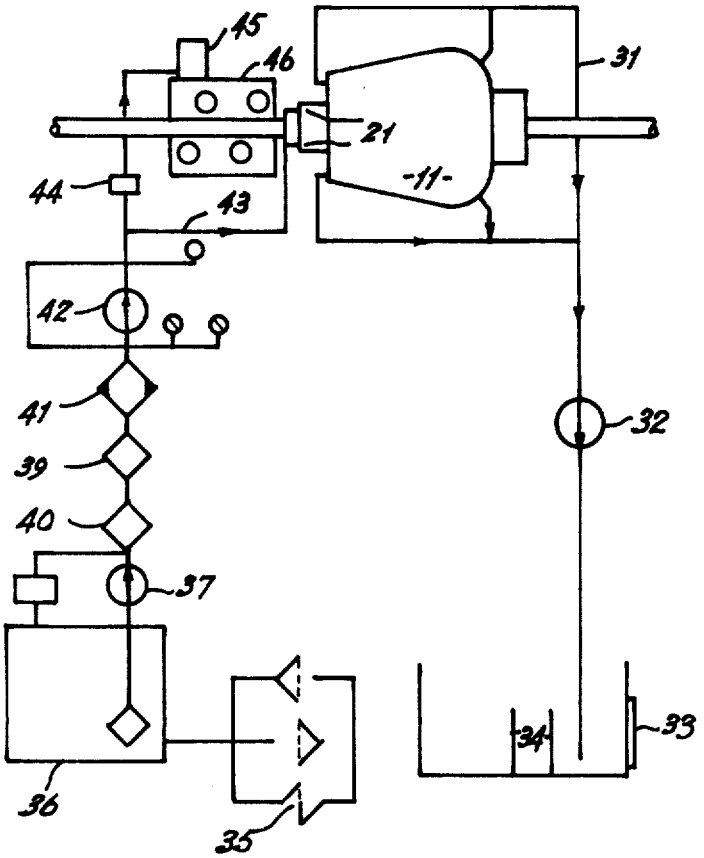
FIG. 2 is a diagrammatic representation of the various components of a complete cleaning system.

As shown in FIG. 2 of the drawings the used fluid is carried through the line 31 by means of a pump 32 and discharged into a settling tank 33 fitted with baffles 34. The fluid is then passed through filters 35 to a clean oil reservoir 36. A pump 37 draws oil from the clean oil reservoir 36 and passes it through filters 39 and 40 and oil cooler 41 to a high pressure pump 42. The high pressure oil is fed through line 43 to the inlets 21 of the cleaning unit. Some of the high pressure oil is by-passed through a reducing valve 44 to a hydraulic motor 45 of a traction unit 46 coupled to the cable cleaning unit.

Figure 3:
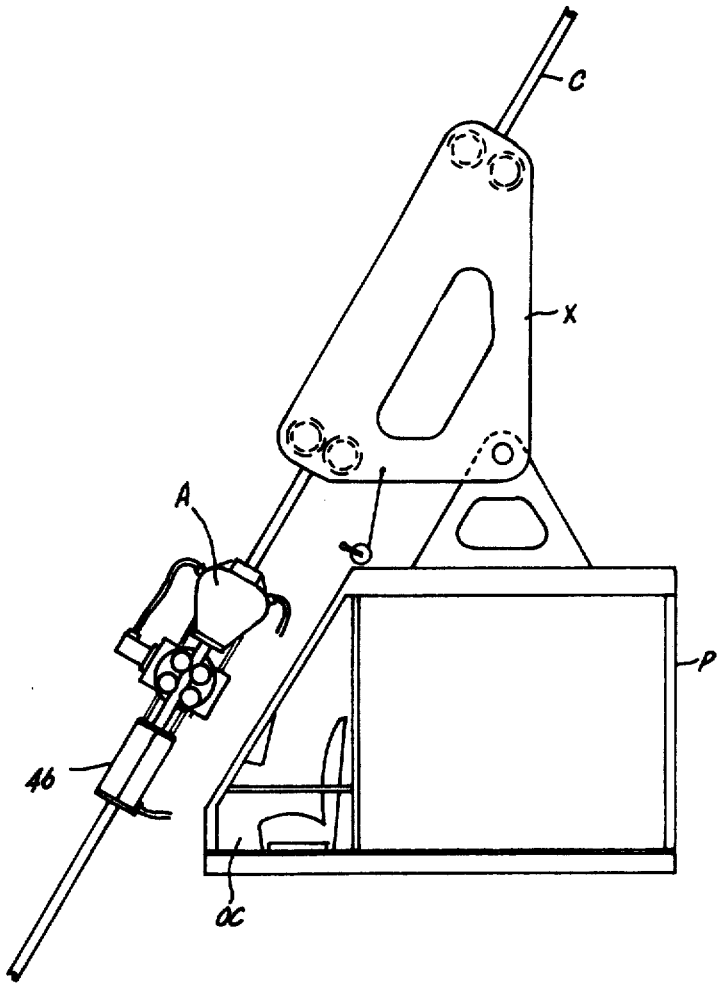
FIG. 3 is a diagrammatic representation of a self propelled unit incorporating the cleaning unit of FIG. 1.
Figure 4:
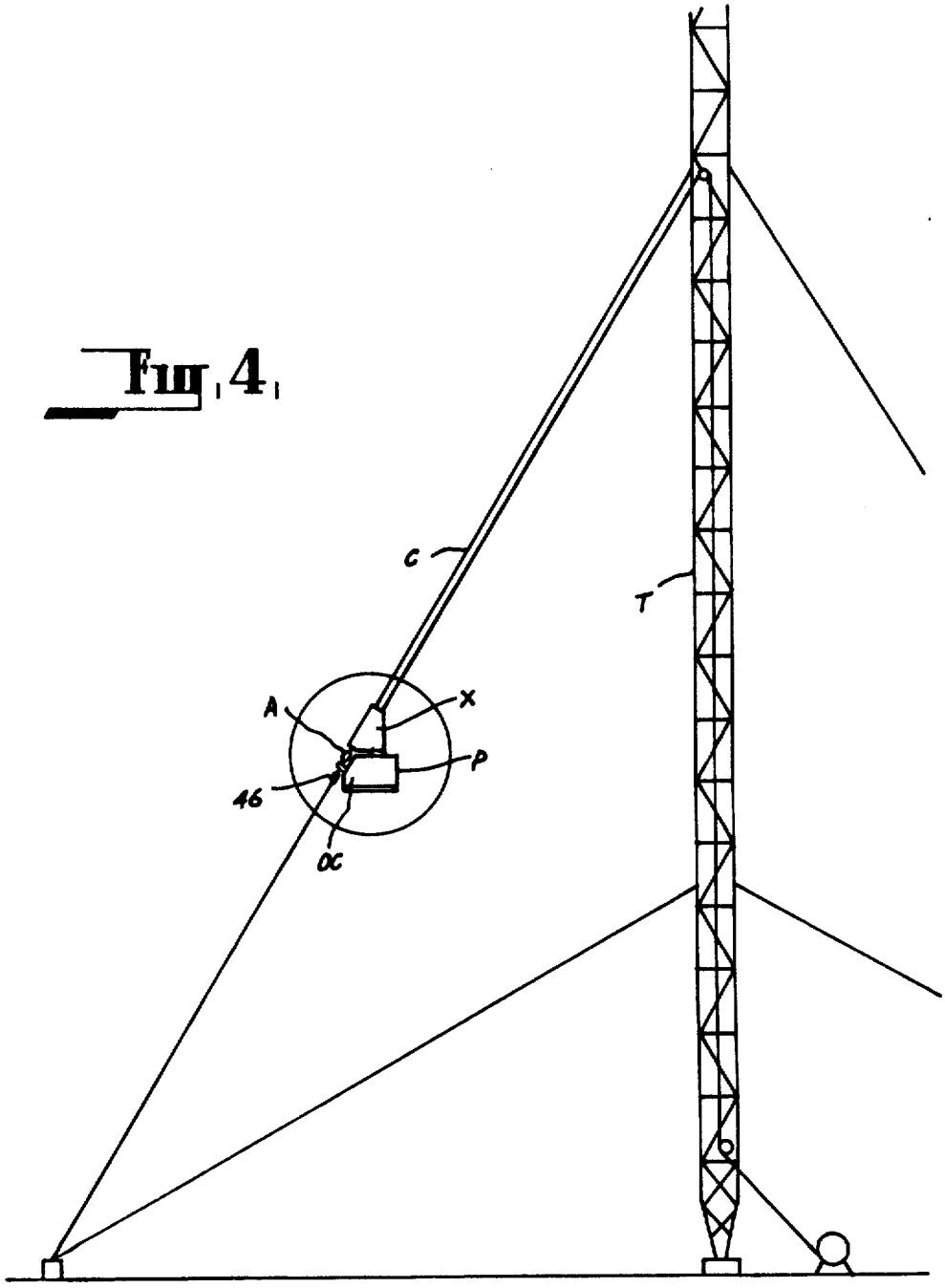
FIG. 4 is a diagrammatic representation showing the self propelled unit cleaning a cable in situ.

The design of the cleaning unit is such that it is relatively lightweight and of compact size so that it can be fitted to cables in situ and drawn along the cables. Such a system is illustrated in FIGS. 3 and 4 of the drawings. The cable cleaning unit A is coupled to a traction unit 46 mounted on a cable C supporting a tower T. The components for cleaning and supplying the oil to the traction unit and cable cleaning unit are housed in a platform P suspended from a cable running assembly X which is mounted on the cable C. The platform is provided with an operators cabin OC.

In use the complete unit is drawn to the top of the cable C and then travels down to the ground under the control of an operator to clean the cable.

In an alternative arrangement the components of the system for supplying oil to the traction unit 46 and the cable cleaning unit A is mounted on a transportable or mobile platform at ground level and the oil supplied through long high pressure hoses.

I claim:

1. A cable cleaning unit comprising a chamber adapted to surround a section of the cable to be cleaned, a plurality of outlets located within the chamber through which jets of high pressure fluid are directed onto the surface of the cable, said outlets being arranged so that said jets strike the surface of the cable at an angle inclined to the longitudinal axis of the cable being cleaned and are deflected from the surface of the cable in the direction of travel of the cable cleaning unit, the portion of the chamber receiving the deflected jets being arcuate so as to direct the fluid with dirt and other matter entrained therein away from the surface of the cable, and means for withdrawing fluid from the chamber.

2. A cable cleaning unit as claimed in claim 1 wherein a manifold having at least one outlet, said arcuate portion of the chamber is provided with a plurality of openings connected to said manifold and said chamber has at least one second outlet remote from said arcuate portion.

3. A cable cleaning unit as claimed in claim 1 wherein a tongue or lip projects into said chamber to prevent used fluid with entrained solid matter from falling back onto and interfering with the action of said jets.

4. A cable cleaning unit as claimed in claim 1 wherein seals are provided at each end of said body.

5. A cable cleaning unit as claimed in claim 4 wherein the rear face of said seals at the forward end of said body are connected to passages which connect to said manifold and means are provided for compressing said seals.

* * * * *